(12) United States Patent
Needham et al.

(10) Patent No.: US 10,068,379 B2
(45) Date of Patent: Sep. 4, 2018

(54) AUTOMATIC PLACEMENT OF AUGMENTED REALITY MODELS

(71) Applicant: Intel Corporation, Santa Clara, CA (US)

(72) Inventors: Bradford H. Needham, North Plains, OR (US); William C. Deleeuw, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,369

(22) Filed: Sep. 30, 2016

(65) Prior Publication Data

US 2018/0096528 A1 Apr. 5, 2018

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01)

(58) Field of Classification Search
CPC .................................................. G06T 19/006
See application file for complete search history.

(56) References Cited

U.S. PATENT DOCUMENTS

| | | | |
|---|---|---|---|
| 2010/0103196 A1 | 4/2010 | Kumar et al. | |
| 2012/0113092 A1 | 5/2012 | Bar-Zeev et al. | |
| 2012/0208592 A1* | 8/2012 | Davis | H04W 4/001 455/556.1 |
| 2013/0278633 A1* | 10/2013 | Ahn | G06T 19/006 345/633 |
| 2013/0278634 A1* | 10/2013 | Xu | G06T 19/006 345/633 |
| 2014/0310595 A1 | 10/2014 | Acharya et al. | |
| 2016/0284126 A1 | 9/2016 | Leppanen et al. | |

FOREIGN PATENT DOCUMENTS

| | | |
|---|---|---|
| WO | 2014/137337 A1 | 9/2014 |
| WO | 2016-094550 A1 | 6/2016 |

OTHER PUBLICATIONS

Fan Zhang and Hanqiu Sun, Dynamic Labeling Management in Virtual and Augmented Environments, Dec. 2005, IEEE, Ninth International Conference on Computer Aided Design and Computer Graphics, 2005, 6 pages.*

(Continued)

*Primary Examiner* — Jeffery A Brier
(74) *Attorney, Agent, or Firm* — Jordan IP Law, LLC (57) ABSTRACT

An embodiment of an augmented reality model placement apparatus may include a location identifier to identify one or more candidate locations in a three-dimensional (3D) model for an augmented reality (AR) model based on the 3D model, the AR model, and placement constraints for the AR model, a location ranker communicatively coupled to the location identifier to assign respective ranks to the one or more identified candidate locations based on placement ranking criteria, and a location selector communicatively coupled to the location ranker to select a placement location for the AR model from the one or more identified candidate locations. Other embodiments are disclosed and claimed.

24 Claims, 6 Drawing Sheets

(56) References Cited

OTHER PUBLICATIONS

David E. Breen, Ross T. Whitaker, Eric Rose, and Mihran Tuceryan, Interactive Occlusion and Automatic Object Placement for Augmented Reality, 1996, Eurographics '96, Eurographics Association, Blackwell Science Ltd., In Computer Graphics Forum, vol. 15, No. 3, pp. 11-22.*

International Search Report and Written Opinion for International Patent Application No. PCT/US2017/054636, dated Jan. 8, 2018, 13 pages.

Anderson et al., "Delineated Monitoring for Ubiquitous Computing", U.S. Appl. No. 15/477,059, filed Apr. 1, 2017, 43 pages.

Marshall et al., "Projected Interactive Display Surface Interactivity Determination", U.S. Appl. No. 15/396,136, filed Dec. 30, 2016, 30 pages.

DAQRI, "DAQRI Smart Helmet: Workers connect to their environment through the power of augmented reality", 2016, 5 pages.

Layar, "Augmented Reality", Layar.com, retrieved Sep. 6, 2016, 3 pages.

Intel, "Imagine. Create. Scan. Share.: We call it Intel RealSense Technology. You'll call it Amazing.", Intel.com, retrieved Sep. 6, 2016, 10 pages.

* cited by examiner

AUTOMATIC PLACEMENT OF AUGMENTED REALITY MODELS

TECHNICAL FIELD

Embodiments generally relate to augmented reality applications. More particularly, embodiments relate to automatic placement of augmented reality models.

BACKGROUND

Placing an augmented reality (AR) model in a three-dimensional (3D) scene may be a relatively tedious or inflexible process. In some AR systems, the user may have to manually place the AR model in the 3D scene, which may involve excessive trial and error before the AR model is precisely placed in a location in the 3D scene which is suitable for intended uses of or interactions with the AR model. In some AR systems, a placement location for an AR model may be tied to fixed targets or objects in the 3D scene, which may limit the flexibility in using or interacting with the AR model.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
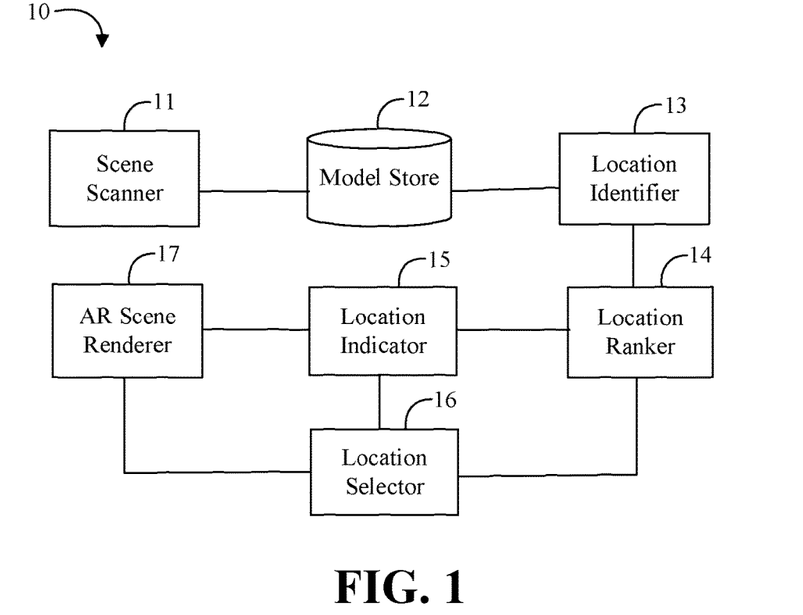
FIG. 1 is a block diagram of an example of an augmented reality system according to an embodiment.

Turning now to FIG. 1, an embodiment of an augmented reality system 10 may include a scanner 11 to scan a space to provide a 3D model of the space and people and objects within the space, a model store 12 communicatively coupled to the scanner 11 to store the 3D model and to store an AR model (e.g. the AR model including placement constraints), a location identifier 13 communicatively coupled to the model store 12 to identify one or more candidate locations in the space for the AR model (e.g. based on the 3D model, the AR model, and the placement constraints), a location ranker 14 communicatively coupled to the location identifier 13 to assign respective ranks to the one or more identified candidate locations based on placement ranking criteria, a location indicator 15 communicatively coupled to the location ranker 14 to indicate (e.g. to a user) one or more of the identified candidate locations based on the assigned respective ranks, and a location selector 16 communicatively coupled to the location ranker 14 and the location indicator 15 to select a placement location in the space for the AR model. Some embodiments of the augmented reality system 10 may further include an AR scene renderer 17 communicatively coupled to the location indicator 15 and the location selector 16 to render an AR scene to present the AR model at each of the indicated candidate locations. For example, the location selector 16 may be further configured to select the placement location in the space for the AR model based on an interaction with a user. The scanner 11 may also be communicatively coupled to other system components such as, for example, the location identifier 13, the location ranker 14, and/or the location indicator 15 (e.g. to track movement or changes in the space).

In some embodiments of the augmented reality system 10, the placement ranking criteria for a candidate location in the 3D model may include, for example, one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

In some embodiments of the AR system 10, the scanner 11 may include or be part of a machine vision system. For example, the scanner 11 may include object recognition and/or image recognition technology to segment, identify, categorize, and/or otherwise recognize objects in the space. For example, the scanner 11 may be able to identify planar surfaces in the space. The scanner 11 may further be able to group related surfaces together and recognize the grouped surfaces as an object such as a table, a cabinet, a chair, a stool, etc. The 3D model may be tagged or include metadata that corresponds to the recognized surfaces or objects. In addition, or alternatively, a user may be able to process the 3D model to group surfaces together as an object and/or to tag surfaces and/or objects with metadata to subsequently aid the ranking/selection of placement locations.

For example, each of the above model store 12, location identifier 13, location ranker 14, location indicator 15, location selector 16, AR scene renderer 17, and other components of the system 10 may be implemented in hardware, software, or any combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. The processor or computing device may include, for example, any combination of a general purpose processor, a central processing unit (CPU), an application specific processor, and/or a graphics processing unit (GPU). For example, computer program code to carry out the operations of the components may be written in any combination of one or more operating system applicable/appropriate programming languages, including an object oriented programming language such as JAVA, JAVASCRIPT, PYTHON, SMALLTALK, C++ or the like and conventional procedural programming languages, such as the "C" programming language or similar programming languages.

Figure 2:
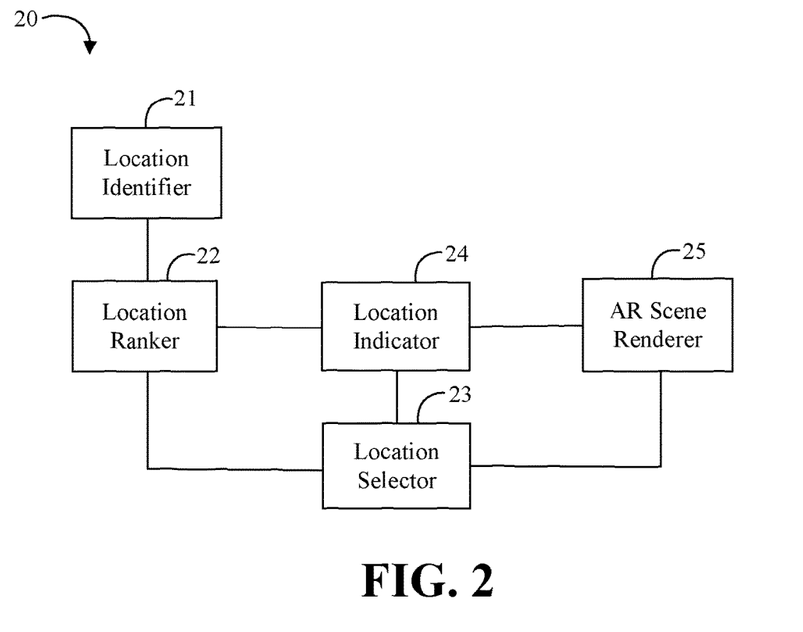
FIG. 2 is a block diagram of an example of augmented reality model placement apparatus according to an embodiment.

Turning now to FIG. 2, an embodiment of an augmented reality model placement apparatus 20 may include a location identifier 21 to identify one or more candidate locations in a 3D model for an AR model (e.g. based on the 3D model, the AR model, and placement constraints for the AR model), a location ranker 22 communicatively coupled to the location identifier 21 to assign respective ranks to the one or more identified candidate locations based on placement ranking criteria, and a location selector 23 communicatively coupled to the location ranker 22 to select a placement location for the AR model from the one or more identified candidate locations. The augmented reality model placement apparatus 20 may further include a location indicator 24 communicatively coupled to the location ranker 22 to indicate (e.g. to a user) one or more of the identified candidate locations based on the assigned respective ranks. In some embodiments, the user settings or other aspects of the placement ranking criteria may effectively result in bypassing the location ranker 22 with a null ranking situation where all identified candidate locations are either unranked or effectively ranked equally and indicated to the user by the location indicator 24 as indicated candidate locations.

For example, the location indicator 24 may be further configured to provide one or more of a visual indication, an audio indication, or a haptic feedback indication to indicate one or more of the identified candidate locations based on the assigned respective ranks. The location indicator 24 may also be further configured to limit a number of indicated candidate locations based on a specified threshold and/or to adjust the indicated candidate locations based on an interaction with a user.

Some embodiments of the augmented reality model placement apparatus 20 may further include an AR scene renderer 25 communicatively coupled to the location indicator 24 and the location selector 23 to render an AR scene to visually present the AR model at each of the indicated candidate locations. For example, location selector 23 may be further configured to select the placement location for the AR model from the indicated (e.g. visually presented) candidate locations based on an interaction with a user. The placement ranking criteria for a candidate location in the 3D model may include, for example, one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

For example, each of the above location identifier 21, location ranker 22, location selector 23, location indicator 24, AR scene renderer 25, and other components of the apparatus 20 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, JAVASCRIPT, PYTHON, SMALLTALK, C++ or the like and conventional procedural programming languages, such as the "C" programming language or similar programming languages.

Figure 3A:
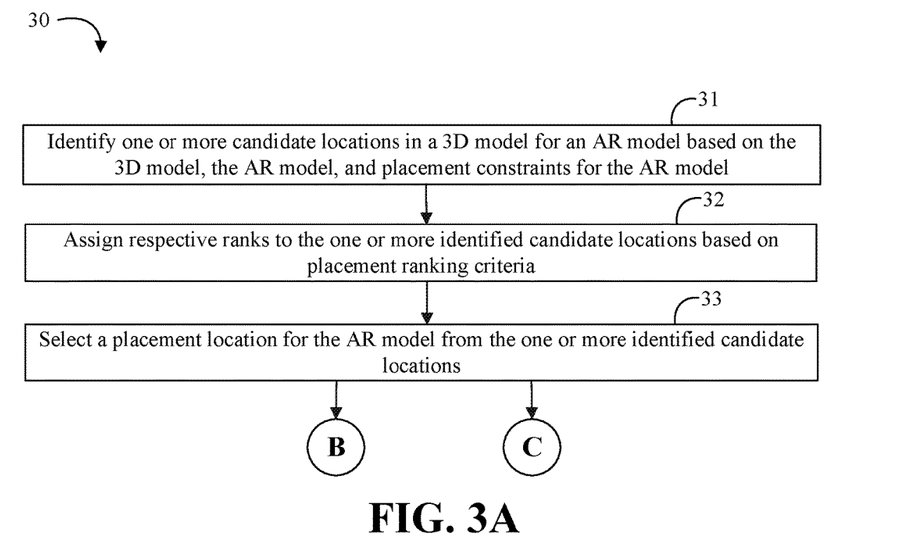
FIGS. 3A to 3C are flowcharts of an example of a method of augmented reality model placement according to an embodiment.
Figure 3B:
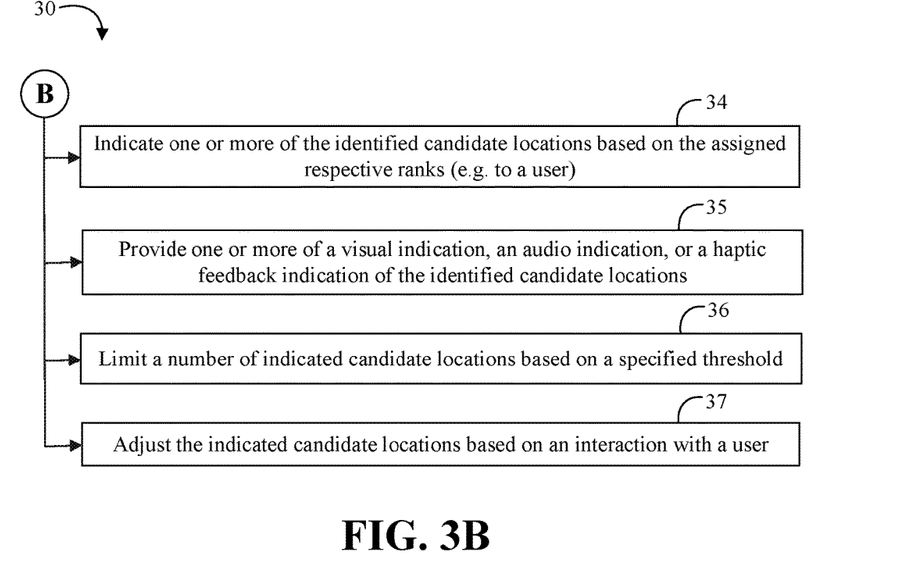
Figure 3C:
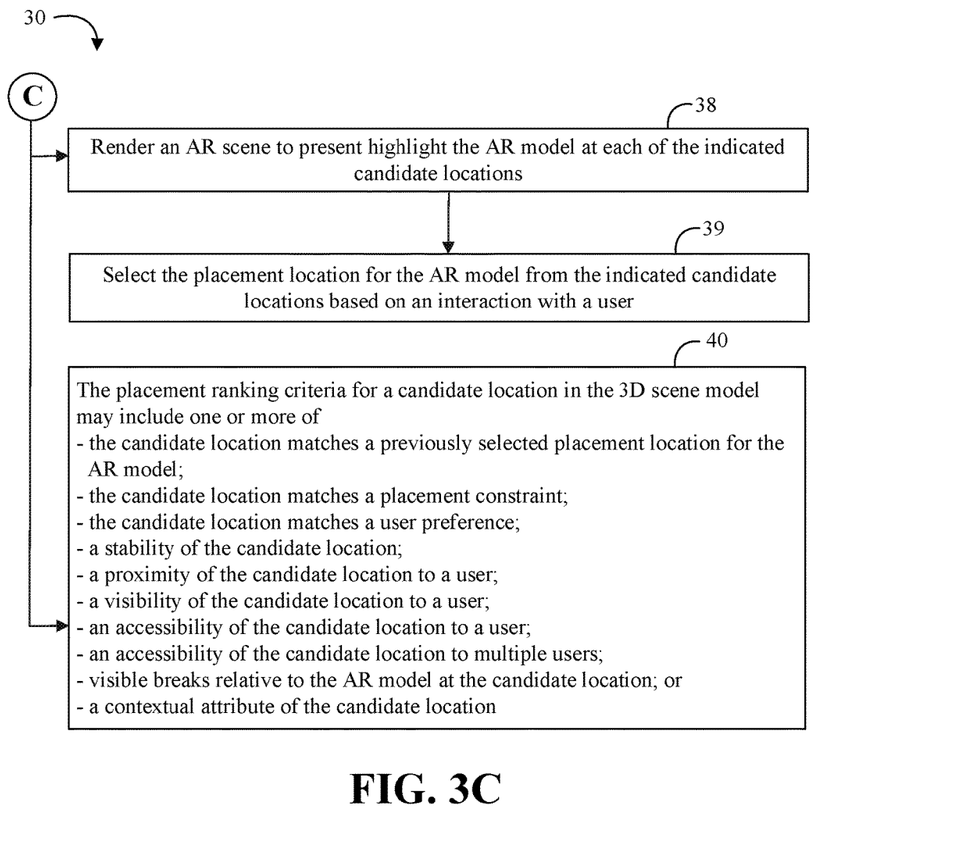

Turning now to FIGS. 3A to 3C, an embodiment of a method 30 of augmented reality model placement may include identifying one or more candidate locations in a 3D model for an AR model based on the 3D model, the AR model, and placement constraints for the AR model at block 31, assigning respective ranks to the one or more identified candidate locations based on placement ranking criteria at block 32, and selecting a placement location for the AR model from the one or more identified candidate locations at block 33. The method 30 may also include indicating one or more of the identified candidate locations based on the assigned respective ranks (e.g. to a user) at block 34.

For example, some embodiments of the method 30 may further include providing one or more of a visual indication, an audio indication, or a haptic feedback indication of the identified candidate locations at block 35. The method 30 may also include limiting a number of indicated candidate locations based on a specified threshold at block 36 and/or adjusting the indicated candidate locations based on an interaction with a user at block 37.

Some embodiments of the method 30 may further include rendering an AR scene to visually present the AR model at each of the indicated candidate locations at block 38, and selecting the placement location for the AR model from the indicated candidate locations based on an interaction with a user at block 39. For example, the placement ranking criteria for a candidate location in the 3D model may include one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location at block 40.

The method 30 may generally be implemented in an apparatus such as, for example, the augmented reality system 10 (see FIG. 1) or the augmented reality model placement apparatus 20 (see FIG. 2), already discussed. More particularly, the method 30 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in method 30 may be written in any combination of one or more operating system applicable/appropriate programming languages, including an object oriented programming language such as JAVA, JAVASCRIPT, PYTHON, SMALLTALK, C++ or the like and conventional procedural programming languages, such as the "C" programming language or similar programming languages. For example, an embodiment of the method 30 may be implemented as at least one computer-readable medium as described in Example 18 to Example 24 below.

In an embodiment of an augmented reality system, a user may want to interact with a scale AR model of an object of interest which appears to be positioned as the physical object would be positioned in the space. For example, the AR model may be resting on (or attached to) a nearby flat surface. The AR model may remain in a fixed position relative to that surface as the user moves about to get different views of the AR model and to interact with the AR model. For example, the user may carry an AR display device such as a smartphone or tablet, or may have a head-worn wearable display such as glasses or a virtual reality headset. In a conventional AR system, manually choosing a surface to anchor the AR model may involve a time-consuming process of trial-and-error that distracts the user from their goal of using the model. To produce a convincing AR experience, the chosen surface should contain a place to put the AR model with a space of appropriate size, relatively clear of clutter, and at an appropriate distance and height to interact with. Further, if multiple co-located people are to experience a common AR model as if it were a physical object in their physical space, the AR model must appear to be on a surface that is physically accessible to all of the people. Advantageously, some embodiments of an augmented reality system may automatically present a set of nearby physical places to anchor an AR model, based on a set of pre-specified constraints. Some embodiments may optionally place the AR model at a default, best-fit candidate location from that set of places (e.g. based on a rank assigned to that candidate location).

Figure 4:
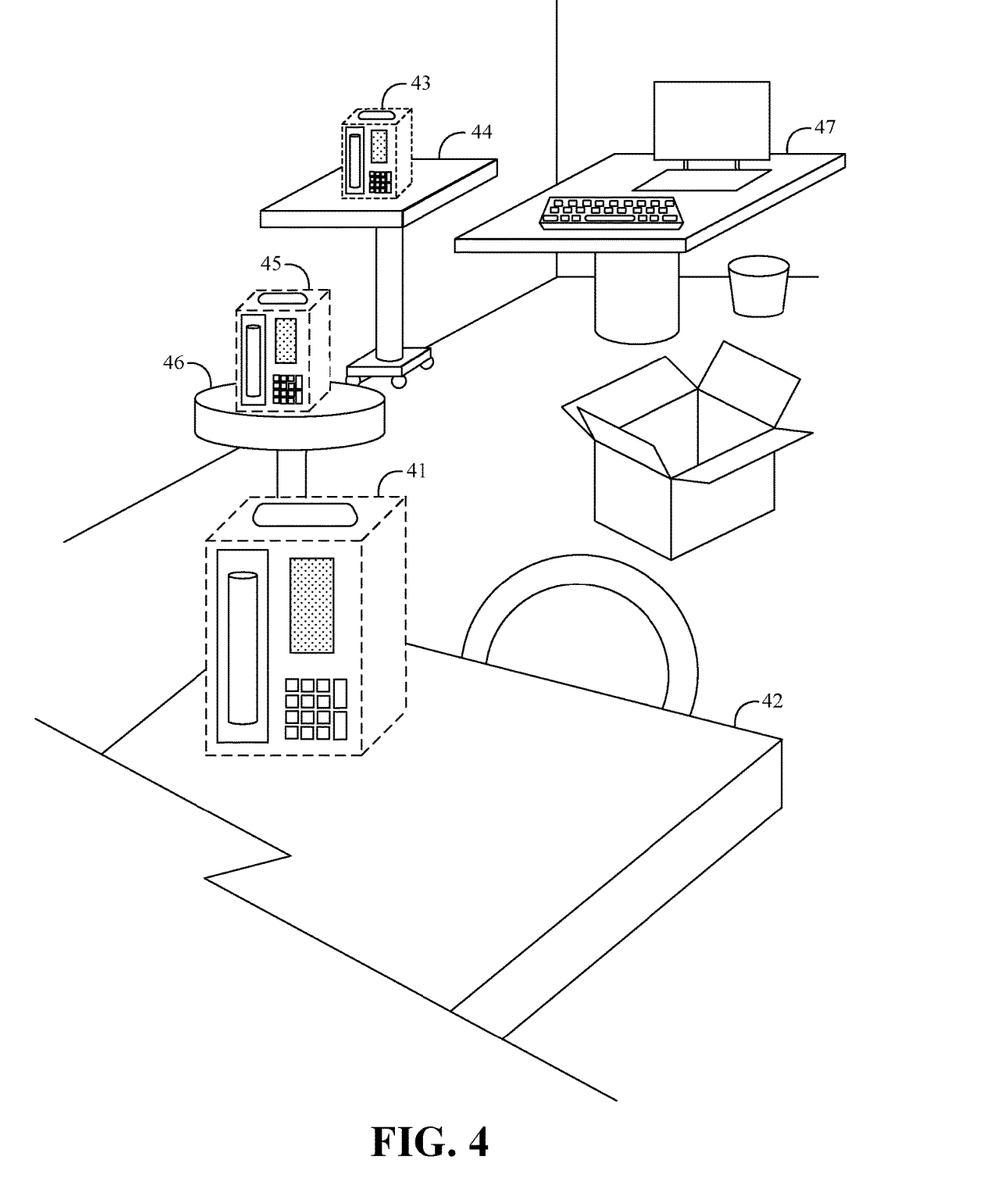
FIG. 4 is an illustration of an example of AR model placement in a space according to an embodiment.

Turning now to FIG. 4, some embodiments may be better understood with an illustrative example. Taking an example where a hospital calibration-lab technician is standing in a cluttered lab area and wishes to interact with an AR model of a specific model patient-controlled analgesia (PCA) device, for example, to understand how to calibrate the real device before it arrives for use in the hospital. The lab technician may don a pair of AR glasses and speak "OK Cal, show me a PCA Model 3 for calibration." The AR system may automatically offer an AR interaction location or automatically offer a choice of candidate locations (e.g. based on a set of criteria). For example, the AR glasses may show a dimmed image of the device in three places in the lab space. A first AR model 41 may be presented at a first candidate location on a table 42 near where the lab tech is standing. A second AR model 43 may be presented at a second candidate location on a movable table 44 in the distance. A third AR model 45 may be presented at a third candidate location on a stool 46. A table 47 may not be indicated as a candidate location because of insufficient space or too much clutter on the table 47 (e.g. or may not be ranked high enough to be indicated). Each of the higher ranked candidate placement locations may be highlighted, may blink, or may have other annotations to clearly demark them as options.

Figure 5:
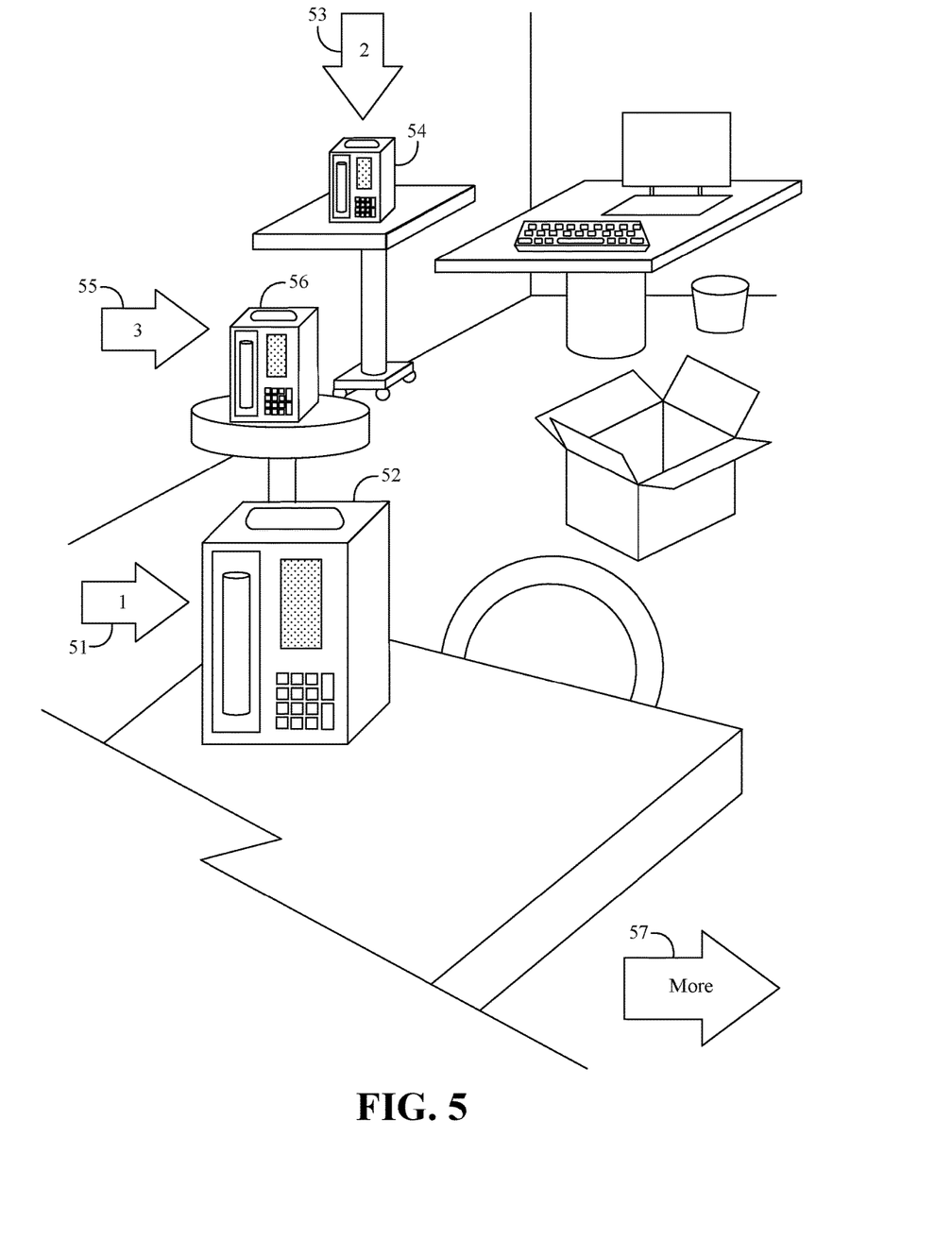
FIG. 5 is an illustration of another example of AR model placement in a space according to an embodiment.

Turning now to FIG. 5, an example of an embodiment of an AR system may alternatively or additionally present additional visual information to indicate candidate locations for the AR model. For example, arrows may point to candidate locations in the visible area of the space and also indicate additional candidate locations that are outside of the current view of the lab technician. A first arrow 51 may point to a first AR model 52 and the arrow 51 may be labeled with a "1" to indicate the highest ranked location. A second arrow 53 may point to a second AR model 54 and the arrow 53 may be labeled with a "2" to indicate the next highest ranked location. A third arrow 55 may point to a third AR model 56 and the arrow 55 may be labeled with a "3" to indicate the third highest ranked location.

An indication does not necessarily have to be applied at the position of the candidate locations. An indication may indicate locations outside of the user's view. For example, another arrow 57 may not point to any particular AR model or candidate location, but instead point in a direction indicating where the technician may look for additional candidate locations (e.g. out of the lab technician's current view). The arrow 57 may include a label such as "More" to help guide the technician. Additionally, or alternatively, sound or haptic feedback indications may help navigate to candidate locations. For example, faster beeping or a change in tone may indicate when the user is close to good candidates (e.g. when the user is turning their head, or utilizing gaze tracking). In some embodiments, audio indications may be localized (e.g. a stereo indication may beep in left ear to indicate a location to the left). In some embodiments, a surround sound system in the space may create sounds behind, over, or below the user as well (e.g. a synthesized speech module may say "Look over here"). Navigational haptic feedback may be particularly useful for hearing impaired users.

The lab technician, in either of the above examples, may then point at a candidate location with their finger and say "that one." At that point, the other two candidate AR images may disappear and the AR model at the selected candidate location may be upgraded or enhanced to the full-color, interactive AR model. Alternatively, an embodiment of the AR system may be configured to show and auto-select only the highest-ranked (best fit) candidate. In that example, in response to the lab technician saying "OK Cal, show me a PCA Model 3 for calibration" the AR system would immediately anchor the AR model to the highest ranked location (e.g. candidate location 1), eliminating the need for the lab technician to choose a location. The user may then say "not there, somewhere else," for example, and cause the system to show the next most highly ranked location. In either of these examples, an embodiment of the AR system advantageously eliminates the need for the lab technician to explicitly choose and express a location to place the AR model using trial and error, reducing the time to start working with the AR model.

As compared to a conventional AR system where AR model placement is overly constrained to a specific location, a specific visual target, or a specific object, for example, another benefit of some embodiments is that the AR model placement is very flexible and adaptable to a changing space. Some embodiments of an AR system may reduce or eliminate the time and effort required to place an AR model while also enabling rich methods of placing the AR model, thereby enabling the user to concentrate on the planned task and not be distracted by the act of choosing a placement location.

Figure 6:
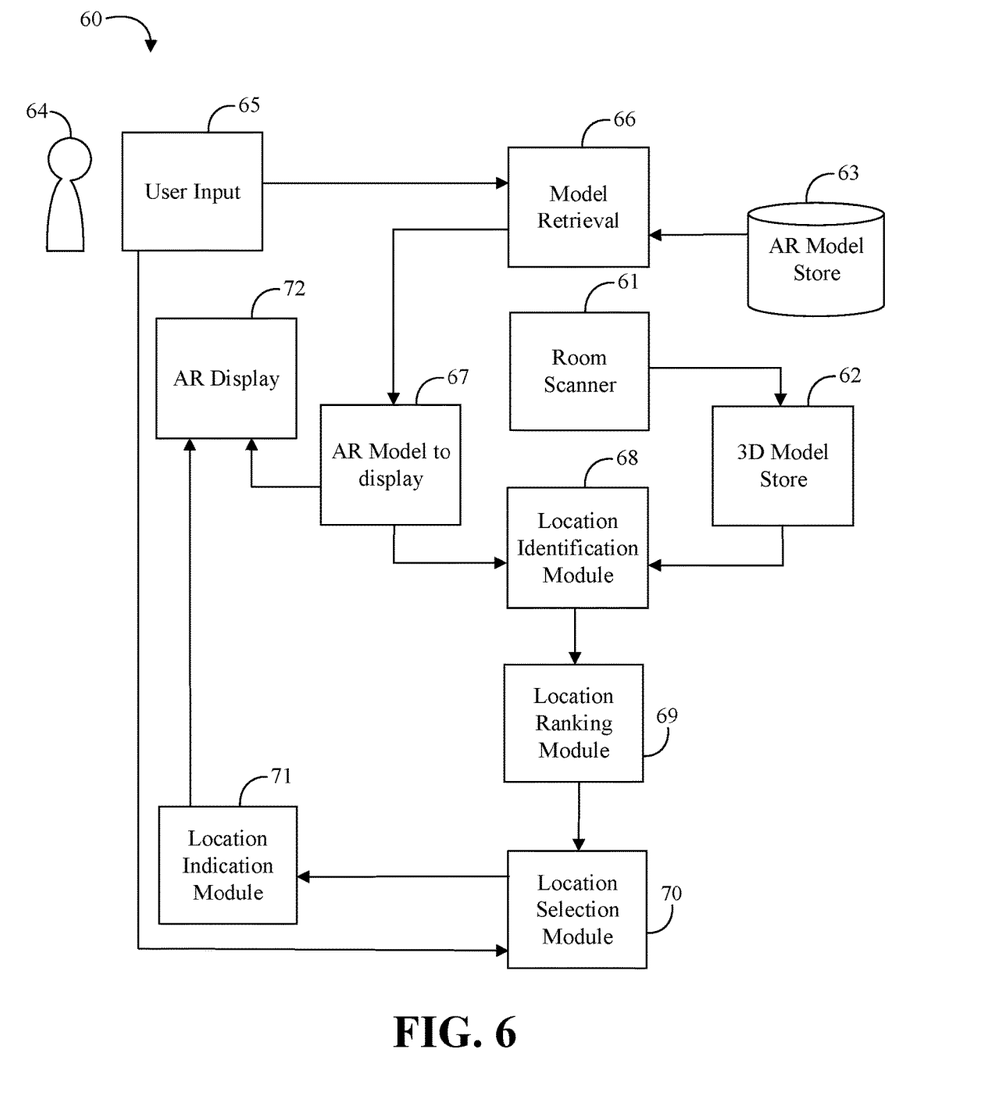
FIG. 6 is a block diagram of another example of an augmented reality system according to an embodiment.

Turning now to FIG. 6, an embodiment of an augmented reality system 60 may include a room scanner 61 to scan a room to provide a 3D model of the room and people and objects within the room and a 3D model store 62 communicatively coupled to the room scanner 61 to store the 3D model. An AR model store 63 may store one or more AR models. For example, the AR models may include placement constraints. A user 64 may interact with the AR system 60 and such interaction may be captured/processed by a user input module 65. Based on user input, a model retrieval module 66 may retrieve a selected AR model to display 67 from the AR model store 63. The AR system 60 may further include a location identification module 68 coupled to the 3D model store 62 and the AR Model to display 67 to identify one or more candidate locations for the AR model in the room (e.g. based on a 3D analysis of the 3D model of the room, the AR model, and the placement constraints).

A location ranking module 69 may be communicatively coupled to the location identification module 68 to rank the one or more identified candidate locations based on placement ranking criteria. A location selection module 70 may be communicatively coupled to the location ranking module 69 to select a placement location in the room for the AR model. The location selection module 70 may be further communicatively coupled to the user input module 65 to select the placement location based on an interaction with the user 64. A location indication module 71 communicatively coupled to the location selection module 70 to indicate (e.g. to a user) one or more of the identified candidate locations based on the assigned respective ranks (e.g. and based on an interaction with the user 64). Some embodiments of the augmented reality system 60 may further include an AR display device 72 communicatively coupled to the location indication module 71 and the AR model to display 67 to present an AR scene including the AR model visually presented at each of the indicated candidate locations.

In some embodiments of the system 60, the room scanner 61 may include any combination of one or more 3D cameras, one or more depth cameras, and/or one or more two-dimensional (2D) cameras, proximity sensors, lasers, ultrasonic rangefinders, and other sensors or devices to develop the 3D model of the room. For example, the room scanner 61 may include one or more INTEL REALSENSE cameras. For example, some embodiments of the system 60 may utilize a simultaneous location and mapping (SLAM) algorithm to map the 3D model of the space relative to one or more cameras or sensors. Although the system 60 is described in connection with a room space, other embodiments of the system 60 may be applied to outdoor or other spaces as well.

In some embodiments of the system 60, all or a portion of the 3D model of the space may be pre-processed or retrieved from a model store. For example, the space may have fixed furniture, counters, equipment, etc. which does not need to be scanned in real-time. A 3D computer-aided design (CAD) model of the space may be provided for the 3D model of the space. For example, the 3D CAD model may serve as a starting point for additional machine vision processing by the room scanner 61 to supplement. Additionally, or alternatively, the user 64 (or a prior user) may process the 3D model to identify objects in the scan which can later aid placement ranking decisions.

Real-time scanning may be an important component of some embodiments of the AR system 60, however the 3D model may be developed or provided, to account for changes in the environment. For example, spaces change over time, furniture gets moved, clutter appears/gets cleared, etc. Space/room lighting may also change and may affect ranking or placement decisions. For example, a location in full sun or a location in shadow (or a well-lit versus darker location) may be preferred for interactions with different AR models. An apparent color of an object or area may affect a ranking/placement decision. For example, the apparent color may change with lighting and may affect the visibility or contrast of the AR model in that location. If the user wants to interact with an AR lock, for example, whether the physical handle/latch is in the open or closed position affects the interaction. Real-time scanning may provide this type of information.

In some embodiments of the system 60, the 3D model store 62 and the AR model store 63 may include any combination of volatile and non-volatile memory. Similarly, the AR model to display 67 may be stored in any combination of volatile and non-volatile memory. The AR model store may also include server or cloud storage, or a cloud service from which the AR model to display is retrieved. The AR model may, for example, include or be derived from an interactive CAD model of a physical device or object.

In some embodiments of the system 60, the user input module 65 may include any combination of one or more 3D cameras, one or more depth cameras, one or more two-dimensional (2D) cameras, proximity sensors, lasers, ultrasonic rangefinders, and other sensors or devices to capture and process an interaction with the user 64. For example, the user input module 65 may include one or more INTEL REALSENSE cameras. In some embodiments, the user input module 65 may share components with the room scanner 61. Non-limiting examples of interaction modes supported by the user input module may include one or more of a keyboard interaction mode, a mouse interaction mode, a touch interaction mode, a voice interaction mode, a gesture interaction mode, a body part cursor interaction mode, a body analysis interaction mode, or a facial analysis interaction mode.

In some embodiments of the system 60, the AR display device 72 may include a head-worn wearable device such as AR glasses (e.g. the DAQRI SMART HELMET) or an AR headset. Another example of a suitable AR display device 72 includes a mobile phone or a tablet. For example, AR scene rendering may be performed at the AR display device 72. Additionally, or alternatively, AR scene rendering may be performed on a computing device which is wirelessly coupled to the AR display device 72 to stream pre-processed AR scenes to the AR display device 72.

In some embodiments of the system 60, the model retrieval module 66 may include a user interface which the user 64 can interact with to select an AR model of interest. Once the user selects the AR model to display, the model retrieval module 66 may retrieve the AR model from the AR model store 63 and make the AR model available as the AR model to display 67.

In some embodiments of the system 60, the location identification module 68 may perform analysis on the 3D model of the room to identify candidate locations for the AR model. Following the scan, the 3D model may include digital representations of surfaces in the room which include 3D coordinates (e.g., X, Y, and Z coordinates) of polygons. For example, the 3D model may include the location, orientation, dimension, and characteristics of surfaces found in the scan. The location identification module 68 may identify surfaces in the 3D model that have suitable dimensions and orientations for placement of the AR model. For example, the location identification module 68 may compare the size of the footprint of the AR model with the size of the horizontal surfaces in the 3D model to identify candidate locations. The location identification module 68 may also determine the height/width/depth of the AR model and compare the locations of other surfaces in the 3D model to determine if there is any interference with the AR model. The identified candidate location may also contain a scale and orientation specification for the AR model. For example, the candidate location may also indicate that the front of the AR model should point a) at the user, or b) to align with the surface it's on (e.g., lining it up with a table). In any event, an identified candidate location may include a coordinate location (e.g. recommended X, Y, Z anchor point of the AR model), an orientation (e.g. a recommended pitch, yaw, roll of the AR model—that is, rotation along the X, Y, and Z axes), and a recommended scale of the AR model (1.0 for life-sized, smaller numbers to use "doll house" style AR, larger numbers to interact as if the user and room were smaller). The AR model recommendation information may be independent of the location/orientation information about the candidate location itself.

The AR model may further include constraints such as additional clearance requirements (e.g. for doors or panels on the AR model, for access to ports, etc.). Some embodiments may compare candidate locations against user preferences (e.g. for ranking/eliminating). Analysis may further group connected surface and perform object recognition to tag surfaces with metadata (e.g. table, chair, counter, etc.). Other characteristics may include surface texture (e.g. planar, soft, flexible, cluttered, etc.). The 3D model can be built from scratch or the 3D model can be provided and loaded. The 3D model may be post-processed to add metadata (e.g. user can tag surfaces/structures in the 3D model with additional information).

Pre-specified placement constraints may include typical or required placement locations such as floor, ceiling, wall, table, and/or flat surfaces. Additional pre-specified constraints may include footprint or surface area, height, width depth, fixed locations, and/or movable locations. Placement constraint may also include access to model (e.g. front and back), preferred clearances (e.g. door swings open), normal mounting (e.g. horizontal/vertical, desk, wall, ceiling, etc.), stability requirements, height, etc. In some embodiments the user may override placement constraints. For example, the AR model may be placed counter to constraints (e.g. not optimal for operation) to interact with the AR model prior placing at its ultimate location (e.g. ceiling fan on table to inspect prior to mounting).

In some embodiments of the system 60, the location ranking module 69 may use the 3D model of the physical space (e.g. including the user), the AR model, and user settings to create a ranked set of possible locations to place the AR model. For example, the location ranking module 69 may rank or score the identified candidate locations from the location identification module 68 based on weighting of a number of criteria. Some criteria may be absolute (e.g. lacking the criterion eliminates the location) or weighted relative to other criteria. Advantageously, some embodiments may allow rich and unexpected criteria which address the problem of where to place an AR model for a user to interact with, and help guide the user with the choice of a placement location.

One example of a placement ranking criteria may include a marked location. For example, the lab may have a space allocated to interacting with AR models, and that space may be marked with a visual tag such as a QR code, bar code, or other machine-readable symbol. Placement targets may also be UV or IR targets which may not be visible to people but may still be machine-readable.

Another example of a placement ranking criteria may include an explicitly configured location. The user may have a personal configuration that specifies either exact location(s) to offer in this space or personal weightings of criteria, such as preferring horizontal, upward-facing surfaces (e.g., tables) to vertical ones (walls) or horizontal downward-facing ones (ceilings).

Another example of a placement ranking criteria may include a commonly-used locations based on past interactions. For example, if this lab technician usually interacts with AR models on the table in the lab, that area may be ranked higher than other locations.

Another example of a placement ranking criteria may include a horizontal or vertical space that is flat and clear of clutter that would interfere with the AR experience. For example, an empty space on a table or a wall. Clutter may be recognized by the room scanner 61 as disturbances on an otherwise flat surface (e.g. the clutter may break up the flat surface).

Another example of a placement ranking criteria may include a stability of the location (e.g. stable vs. moving locations). In one example, a location may be identified as a moving place if it moves while being captured by the room scanner 61 or while being assessed by the location ranking module 69. Another example includes a more complex algorithm such as machine vision or image recognition that may recognize likely-movable places such as the top of a chair or stool.

Another example of a placement ranking criteria may include a proximity to the user. Nearer locations, such as candidate location 1 in FIG. 5, may be favored over more distant locations, such as candidate location 2 in FIG. 5.

Another example of a placement ranking criteria may include a visibility to the user. A location in front of the user may be weighted more heavily than one behind the user.

Another example of a placement ranking criteria may include locations that afford physical interaction. For example, locations that are at forearm-height while standing may be preferred over locations near the ceiling or on the floor.

Another example of a placement ranking criteria may include collaboratively-visible or accessible locations. Given a second or third user intended to simultaneously interact with the AR model, the location ranking module 69 may favor locations that are visible to all users and/or are within reach of all users.

Another example of a placement ranking criteria may include a location without a visible break. Aesthetically, a user may prefer that the AR model does not appear to cross a seam in the background such as an edge of a blackboard, a whiteboard, or a painting on the wall.

Another example of a placement ranking criteria may include a semantic/contextual attribute of a location. For example, a user may prefer AR interaction locations that are out of the sun, away from the flow of traffic in the room, close to power plugs (for replacing the AR model with the real device), dry vs. wet locations (e.g., not in the sink). Semantics applies to meaning of the location (e.g. what something is in addition to where it is) and/or a definitional aspect of an object in the model. For example, a candidate location for an AR model of a candle on top of a ceramic skull might be ranked higher in October (e.g. for Halloween). For example, a water surface may be recognized as flat but doesn't hold anything heavier than water. If an object is recognized as an aquarium, the top surface may be ranked lower for most AR models (e.g. but may be ranked higher for an AR model of a toy boat). Placement ranking criteria may include a physical modeling of objects in room (e.g. a stack of books). If an AR model corresponds to a relatively heavy physical device, the location ranking module 69 may give a lower rank to a less stable surface (e.g. the stacks of books gets low ranking). Although with an AR model there may be no harm in selecting the location, so user can still pick the top of aquarium (e.g. depending on the point of the interaction—to eventually place a physical model or just to interact with the AR model).

In some embodiments of the system 60, the location selection module 70 may either simply select the highest-ranked location or may interact with the user 64 to enable the user 64 to select one location from the set of indicated candidate locations. For example, the location selection module 70 may optionally include an interface to guide the user 64 to currently-invisible locations, such as a candidate location behind the user 64.

In some embodiments of the system 60, the location indication module 71 may provide an initial visual indication that may be lower fidelity (e.g. low contrast). In some embodiments, the initial indication may be a simpler or rougher AR model depending on available computational resources.

In another illustrative example, a user may walk into a space with a vase with flowers. The user may be presented with numerous possible locations for the vase, contextually ranked. Computationally highly ranked location may be presented along with unconventional locations which may end up being aesthetically pleasing and guide user to pick a lower ranked location. For example, a window sill may be narrower than the vase, which lowers its ranking, but the sill may be wide enough to be stable and in full sun. Multiple options, including lower ranked may be presented so user can choose (advantageously the user can visualize many locations quickly without trial and error).

In accordance with some embodiments, the AR system may include different options among models to place. For example, the user may have four different vases. Some embodiments may show one vase in one candidate location and a different vase in a different candidate location. The vases may have different color options. Some embodiments may show a red vase in one location and blue vase in another location (e.g. based on lighting or aesthetics).

In another illustrative example, a user may want to play with AR toys or action figures. The user may have a big one (e.g. AR castle) and a smaller one (e.g. AR superhero). Some embodiments may show multiple options for areas in the space to play with each/either one. For example, the AR castle may be shown on a table or the floor while the AR superhero may be shown in a number of smaller spaces. The options may be presented based on a combination of rankings. For example, top rank may be the AR castle on the floor and the second rank may be the AR superhero on the couch. Ultimately, the user decides which to pick.

In another illustrative example, a piece of lab equipment may be available as either wall-mounted, desktop, or mobile options. Each of the options may be shown in the same space for the user to interact with and evaluate. The candidate location ranking may be based on available models (e.g. from a group or set), together with suitable locations for those models.

In another illustrative example, operational aspects of AR model may trigger based on user interaction. For example, several AR lamps all on at once at several candidate locations may not be helpful. In some embodiments, the AR lamps may initially be placed in an OFF state. Using gaze tracking or gesture recognition, only the AR model of the lamp the user selects (e.g. by looking at it or pointing to it) may become operational such that additional modeling of the light throw pattern from the AR lamp is also shown. Similarly, an animated AR model may be shown in a static state, going into motion only when the user has selected it. For example, an AR model of a helicopter may have blades that start twirling when the user looks at it. The user can take turns trying the AR models in the candidate locations before selecting the placement location.

In some embodiments, the user interface may include the ability to preset various settings and to subsequently adjust those settings to improve the user experience. For example, the user may increase/decrease various display/ranking thresholds so that the user is not overwhelmed with candidates. Initially some embodiments may show the top N (user-selectable) candidate locations, and then show the next set as the user indicates. For example, the user interface may include slider bars to adjust categories of ranking and the user interaction can affect which locations are indicated (e.g. slider bar for proximity, stability, aesthetic, etc.).

Additional Notes and Examples

Example 1 may include an augmented reality system, comprising a scanner to scan a space to provide a three-dimensional (3D) model of the space and people and objects within the space, a model store communicatively coupled to the scanner to store the 3D model and to store an augmented reality (AR) model, the AR model including placement constraints, a location identifier communicatively coupled to the model store to identify one or more candidate locations in the space for the AR model based on the 3D model, the AR model, and the placement constraints, a location ranker communicatively coupled to the location identifier to assign respective ranks to the one or more identified candidate locations based on placement ranking criteria, a location indicator communicatively coupled to the location ranker to indicate one or more of the identified candidate locations based on the assigned respective ranks, and a location selector communicatively coupled to the location ranker and the location indicator to select a placement location in the space for the AR model from the one or more identified candidate locations.

Example 2 may include the augmented reality system of Example 1, further comprising an AR scene renderer communicatively coupled to the location indicator and the location selector to render an AR scene to visually present the AR model at each of the indicated candidate locations, wherein the location selector is further to select the placement location in the space for the AR model from the indicated candidate locations based on an interaction with a user.

Example 3 may include the augmented reality system of any of Examples 1 to 2, wherein the placement ranking criteria for a candidate location in the 3D model includes one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

Example 4 may include an augmented reality model placement apparatus, comprising a location identifier to identify one or more candidate locations in a three-dimensional (3D) model for an augmented reality (AR) model based on the 3D model, the AR model, and placement constraints for the AR model, a location ranker communicatively coupled to the location identifier to assign respective ranks to the one or more identified candidate locations based on placement ranking criteria, and a location selector communicatively coupled to the location ranker to select a placement location for the AR model from the one or more identified candidate locations.

Example 5 may include the augmented reality model placement apparatus of Example 4, further comprising a location indicator communicatively coupled to the location ranker to indicate one or more of the identified candidate locations based on the assigned respective ranks.

Example 6 may include the augmented reality model placement apparatus of Example 5, wherein the location indicator is further to provide one or more of a visual indication, an audio indication, or a haptic feedback indication to indicate one or more of the identified candidate locations based on the assigned respective ranks.

Example 7 may include the augmented reality model placement apparatus of any of Examples 5 to 6, further comprising an AR scene renderer communicatively coupled to the location indicator and the location selector to render an AR scene to visually present the AR model at each of the indicated candidate locations, wherein the location selector is further to select the placement location for the AR model from the indicated candidate locations based on an interaction with a user.

Example 8 may include the augmented reality model placement apparatus of any of Examples 4 to 7, wherein the placement ranking criteria for a candidate location in the 3D model includes one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

Example 9 may include the augmented reality model placement apparatus of any of Examples 5 to 8, wherein the location indicator is further to limit a number of indicated candidate locations based on a specified threshold.

Example 10 may include the augmented reality model placement apparatus of Example 5 to 9, wherein the location indicator is further to adjust the indicated candidate locations based on an interaction with a user.

Example 11 may include a method of augmented reality model placement, comprising identifying one or more candidate locations in a three-dimensional (3D) model for an augmented reality (AR) model based on the 3D model, the AR model, and placement constraints for the AR model, assigning respective ranks to the one or more identified candidate locations based on placement ranking criteria, and selecting a placement location for the AR model from the one or more identified candidate locations.

Example 12 may include the method of augmented reality model placement of Example 11, further comprising indicating one or more of the identified candidate locations based on the assigned respective ranks.

Example 13 may include the method of augmented reality model placement of Example 12, further comprising providing one or more of a visual indication, an audio indication, or a haptic feedback indication of the identified candidate locations.

Example 14 may include the method of augmented reality model placement of any of Examples 12 to 13, further comprising rendering an AR scene to visually present the AR model at each of the indicated candidate locations, and selecting the placement location for the AR model from the indicated candidate locations based on an interaction with a user.

Example 15 may include the method of augmented reality model placement of any of Examples 11 to 14, wherein the placement ranking criteria for a candidate location in the 3D model includes one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

Example 16 may include the method of augmented reality model placement of any of Examples 12 to 15, further comprising limiting a number of indicated candidate locations based on a specified threshold.

Example 17 may include the method of augmented reality model placement of Example 12 to 16, further comprising adjusting the indicated candidate locations based on an interaction with a user.

Example 18 may include at least one computer-readable medium comprising a set of instructions, which when executed by a computing device, cause the computing device to identify one or more candidate locations in a three-dimensional (3D) model for an augmented reality (AR) model based on the 3D model, the AR model, and placement constraints for the AR model, assign respective ranks to the one or more identified candidate locations based on placement ranking criteria, and select a placement location for the AR model from the one or more identified candidate locations.

Example 19 may include the at least one computer-readable medium of Example 18, comprising a further set of instructions, which when executed by a computing device, cause the computing device to indicate one or more of the identified candidate locations based on the assigned respective ranks.

Example 20 may include the at least one computer-readable medium of Example 19, comprising a further set of instructions, which when executed by a computing device, cause the computing device to provide one or more of a visual indication, an audio indication, or a haptic feedback indication of the identified candidate locations.

Example 21 may include the at least one computer-readable medium of any of Examples 19 to 20, comprising a further set of instructions, which when executed by a computing device, cause the computing device to render an AR scene to visually present the AR model at each of the indicated candidate locations, and select the placement location for the AR model from the indicated candidate locations based on an interaction with a user.

Example 22 may include the at least one computer-readable medium of any of Examples 18 to 21, wherein the placement ranking criteria for a candidate location in the 3D model includes one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

Example 23 may include the at least one computer-readable medium of any of Examples 19 to 22, comprising a further set of instructions, which when executed by a computing device, cause the computing device to limit a number of indicated candidate locations based on a specified threshold.

Example 24 may include the at least one computer-readable medium of any of Examples 19 to 23, comprising a further set of instructions, which when executed by a computing device, cause the computing device to adjust the indicated candidate locations based on an interaction with a user.

Example 25 may include a augmented reality model placement apparatus, comprising means for identifying one or more candidate locations in a three-dimensional (3D) model for an augmented reality (AR) model based on the 3D model, the AR model, and placement constraints for the AR model, means for assigning respective ranks to the one or more identified candidate locations based on placement ranking criteria, and means for selecting a placement location for the AR model from the one or more identified candidate locations.

Example 26 may include the augmented reality model placement apparatus of Example 25, further comprising means for indicating one or more of the identified candidate locations based on the assigned respective ranks.

Example 27 may include the augmented reality model placement apparatus of Example 26, further comprising means for providing one or more of a visual indication, an audio indication, or a haptic feedback indication of the identified candidate locations.

Example 28 may include the augmented reality model placement apparatus of any of Examples 26 to 27, further comprising means for rendering an AR scene to visually present the AR model at each of the indicated candidate locations, and means for selecting the placement location for the AR model from the indicated candidate locations based on an interaction with a user.

Example 29 may include the augmented reality model placement apparatus of any of Examples 25 to 28, wherein the placement ranking criteria for a candidate location in the 3D model includes one or more of: the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

Example 30 may include the augmented reality model placement apparatus of any of Examples 26 to 29, further comprising means for limiting a number of indicated candidate locations based on a specified threshold.

Example 31 may include the augmented reality model placement apparatus of Example 26 to 30, further comprising means for adjusting the indicated candidate locations based on an interaction with a user.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. An augmented reality system, comprising:
a scanner to scan a space to provide a three-dimensional (3D) model of the space and people and objects within the space;
a model store communicatively coupled to the scanner to store the 3D model and to store an augmented reality (AR) model, the AR model including placement constraints;
a location identifier communicatively coupled to the model store to identify one or more candidate locations in the space for the AR model based on the 3D model, the AR model, and the placement constraints;

a location ranker communicatively coupled to the location identifier to assign respective ranks to the one or more identified candidate locations based on placement ranking criteria;
a location indicator communicatively coupled to the location ranker to indicate one or more of the identified candidate locations based on the assigned respective ranks; and
a location selector communicatively coupled to the location ranker and the location indicator to select a placement location in the space for the AR model from the one or more identified candidate locations.

2. The augmented reality system of claim 1, further comprising:
an AR scene renderer communicatively coupled to the location indicator and the location selector to render an AR scene to visually present the AR model at each of the indicated candidate locations,
wherein the location selector is further to select the placement location in the space for the AR model from the indicated candidate locations based on an interaction with a user.

3. The augmented reality system of claim 1, wherein the placement ranking criteria for a candidate location in the 3D model includes one or more of the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

4. An augmented reality model placement apparatus, comprising:
a location identifier to identify one or more candidate locations in a three-dimensional (3D) model for an augmented reality (AR) model based on the 3D model, the AR model, and placement constraints for the AR model;
a location ranker communicatively coupled to the location identifier to assign respective ranks to the one or more identified candidate locations based on placement ranking criteria; and
a location selector communicatively coupled to the location ranker to select a placement location for the AR model from the one or more identified candidate locations.

5. The augmented reality model placement apparatus of claim 4, further comprising:
a location indicator communicatively coupled to the location ranker to indicate one or more of the identified candidate locations based on the assigned respective ranks.

6. The augmented reality model placement apparatus of claim 5, wherein the location indicator is further to provide one or more of a visual indication, an audio indication, or a haptic feedback indication to indicate one or more of the identified candidate locations based on the assigned respective ranks.

7. The augmented reality model placement apparatus of claim 5, further comprising:
an AR scene renderer communicatively coupled to the location indicator and the location selector to render an AR scene to visually present the AR model at each of the indicated candidate locations,
wherein the location selector is further to select the placement location for the AR model from the indicated candidate locations based on an interaction with a user.

8. The augmented reality model placement apparatus of claim 4, wherein the placement ranking criteria for a candidate location in the 3D model includes one or more of the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

9. The augmented reality model placement apparatus of claim 5, wherein the location indicator is further to limit a number of indicated candidate locations based on a specified threshold.

10. The augmented reality model placement apparatus of claim 5, wherein the location indicator is further to adjust the indicated candidate locations based on an interaction with a user.

11. A method of augmented reality model placement, comprising:
identifying one or more candidate locations in a three-dimensional (3D) model for an augmented reality (AR) model based on the 3D model, the AR model, and placement constraints for the AR model;
assigning respective ranks to the one or more identified candidate locations based on placement ranking criteria; and
selecting a placement location for the AR model from the one or more identified candidate locations.

12. The method of augmented reality model placement of claim 11, further comprising:
indicating one or more of the identified candidate locations based on the assigned respective ranks.

13. The method of augmented reality model placement of claim 12, further comprising:
providing one or more of a visual indication, an audio indication, or a haptic feedback indication of the identified candidate locations.

14. The method of augmented reality model placement of claim 12, further comprising:
rendering an AR scene to visually present the AR model at each of the indicated candidate locations; and
selecting the placement location for the AR model from the indicated candidate locations based on an interaction with a user.

15. The method of augmented reality model placement of claim 11, wherein the placement ranking criteria for a candidate location in the 3D model includes one or more of the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

16. The method of augmented reality model placement of claim 12, further comprising:

limiting a number of indicated candidate locations based on a specified threshold.

17. The method of augmented reality model placement of claim 12, further comprising:
adjusting the indicated candidate locations based on an interaction with a user.

18. At least one non-transitory computer-readable medium comprising a set of instructions, which when executed by a computing device, cause the computing device to:
identify one or more candidate locations in a three-dimensional (3D) model for an augmented reality (AR) model based on the 3D model, the AR model, and placement constraints for the AR model;
assign respective ranks to the one or more identified candidate locations based on placement ranking criteria; and
select a placement location for the AR model from the one or more identified candidate locations.

19. The at least one non-transitory computer-readable medium of claim 18, comprising a further set of instructions, which when executed by a computing device, cause the computing device to:
indicate one or more of the identified candidate locations based on the assigned respective ranks.

20. The at least one non-transitory computer-readable medium of claim 19, comprising a further set of instructions, which when executed by a computing device, cause the computing device to:
provide one or more of a visual indication, an audio indication, or a haptic feedback indication of the identified candidate locations.

21. The at least one non-transitory computer-readable medium of claim 19, comprising a further set of instructions, which when executed by a computing device, cause the computing device to:
render an AR scene to visually present the AR model at each of the indicated candidate locations; and
select the placement location for the AR model from the indicated candidate locations based on an interaction with a user.

22. The at least one non-transitory computer-readable medium of claim 18, wherein the placement ranking criteria for a candidate location in the 3D model includes one or more of the candidate location matches a previously selected placement location for the AR model, the candidate location matches a placement constraint, the candidate location matches a user preference, a stability of the candidate location, a proximity of the candidate location to a user, a visibility of the candidate location to a user, an accessibility of the candidate location to a user, an accessibility of the candidate location to multiple users, visible breaks relative to the AR model at the candidate location, or a contextual attribute of the candidate location.

23. The at least one non-transitory computer-readable medium of claim 19, comprising a further set of instructions, which when executed by a computing device, cause the computing device to:
limit a number of indicated candidate locations based on a specified threshold.

24. The at least one non-transitory computer-readable medium of claim 19, comprising a further set of instructions, which when executed by a computing device, cause the computing device to:
adjust the indicated candidate locations based on an interaction with a user.

* * * * *